(12) United States Patent
Ganesan et al.

(10) Patent No.: US 12,004,121 B2
(45) Date of Patent: Jun. 4, 2024

(54) COMMUNICATION DEVICES AND METHODS FOR PROVIDING UPLINK AND SIDELINK RESOURCE RESERVATION SCHEMES

(71) Applicant: HUAWEI TECHNOLOGIES CO., LTD., Guangdong (CN)

(72) Inventors: Karthikeyan Ganesan, Munich (DE); Ali Ramadan Ali, Munich (DE); Ömer Bulakci, Munich (DE); Dan Hu, Beijing (CN); Mohamed Gharba, Munich (DE); Mate Boban, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 17/242,941

(22) Filed: Apr. 28, 2021

(65) Prior Publication Data

US 2021/0250913 A1    Aug. 12, 2021

Related U.S. Application Data

(63) Continuation of application No. PCT/EP2018/079868, filed on Oct. 31, 2018.

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01); *H04W 76/14* (2018.02)

(58) Field of Classification Search
CPC . H04W 72/02; H04W 28/26; H04W 72/0446; H04W 76/14
See application file for complete search history.

(56) References Cited

U.S. PATENT DOCUMENTS

2017/0041902 A1* 2/2017 Sheng .................. H04W 72/02
2018/0227882 A1* 8/2018 Freda .................... H04W 8/005
(Continued)

FOREIGN PATENT DOCUMENTS

CN       106576354 A        4/2017
WO    WO-2018202797 A1 * 11/2018  ........ H04W 36/0009

OTHER PUBLICATIONS

Intel Corporation, Enhancements of NR and LTE Uu Link to Control NR Sidelink3GPP TSG RAN WG1 Meeting #94bis, Chengdu, China, Oct. 8-12, 2018, R1-1810778 (Year: 2018).*

(Continued)

*Primary Examiner* — Shailendra Kumar
(74) *Attorney, Agent, or Firm* — Fish & Richardson P.C.

(57) ABSTRACT

The present disclosure relates to wireless communication devices, network devices, and wireless communication methods. One example wireless communication device selects and reserves a specific resource or a specific transmission pattern for a predetermined time period. The wireless communication device sends, to at least one User Equipment (UE), a sidelink control message using a determined sidelink resource, the sidelink control message indicating the specific resource or the specific transmission pattern. The wireless communication device transmits an uplink or sidelink data message using the specific resource or the specific transmission pattern.

20 Claims, 16 Drawing Sheets

(51) Int. Cl.
*H04W 72/0446* (2023.01)
*H04W 76/14* (2018.01)

(56) References Cited

U.S. PATENT DOCUMENTS

| | | | |
|---|---|---|---|
| 2019/0045465 A1* | 2/2019 | Lee | H04W 92/18 |
| 2020/0059960 A1* | 2/2020 | Shimezawa | H04L 1/1809 |
| 2021/0160822 A1* | 5/2021 | Hassan | H04W 72/0453 |
| 2021/0168814 A1* | 6/2021 | Chen | H04W 72/02 |

OTHER PUBLICATIONS

1 Office Action issued in Chinese Application No. 201880099137.3 on Sep. 27, 2022, 12 pages.
3GPP TS 38.212 V15.3.0 (Sep. 2018), "3rd Generation Partnership Project; Technical Specification Group Radio Access Network; NR; Multiplexing and channel coding(Release 15)," Sep. 2018, 99 pages.
3GPP TS 38.213 V15.3.0 (Sep. 2018), "3rd Generation Partnership Project; Technical Specification Group Radio Access Network; NR; Physical layer procedures for control(Release 15)," Sep. 2018, 101 pages.
3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.
Intel Corporation, "Enhancements of NR and LTE Uu Link to Control NR Sidelink," 3GPP TSG RAN WG1 Meeting #94bis, R1-1810778, Chengdu, China, Oct. 8-12, 2018, 9 pages.
PCT International Search Report and Written Opinion issued in International Application No. PCT/EP2018/079868 on May 31, 2019, 12 pages.
Qualcomm Incorporated, "eMBB and URLLC dynamic multiplexing and preemption indication on the uplink," 3GPP TSG-RAN WG1 #92b, R1-1804820, Sanya, China, Apr. 16-20, 2018, 11 pages.

* cited by examiner

COMMUNICATION DEVICES AND METHODS FOR PROVIDING UPLINK AND SIDELINK RESOURCE RESERVATION SCHEMES

CROSS-REFERENCE TO RELATED APPLICATIONS

This application is a continuation of International Application No. PCT/EP2018/079868, filed on Oct. 31, 2018, the disclosure of which is hereby incorporated by reference in its entirety.

TECHNICAL FIELD

The present disclosure relates generally to the field of mobile communication, and, more particularly, to a wireless communication device (e.g., a User Equipment (UE)), a network device (e.g., a Base Station (BS)), a method for the wireless communication device, and a method for the network device for providing an Uplink (UL) or a Sidelink (SL) resource reservation scheme.

BACKGROUND

Generally, cooperative UL resource reservation schemes for Ultra-Reliable Low-Latency Communication (URLLC) and Enhanced Mobile Broadband (eMBB) coexistence are known. The conventional UL Grant-free (GF) is applicable for low latency data transmission but the reliability is affected due to resource collision.

The disadvantages of the conventional UL resource reservation schemes can be summarized as follow:
  Many User Equipment's (UEs) could select the same GF resource in a cell.
  A higher usage of the GF resource in a cell reduces its spectral efficiency due to collision.
  By assuming that the GF-URLLC is not coordinated among the next generation NodeB (gNBs) in a deployment, e.g., in a case of resource reuse. The URLLC UEs connected to different gNBs, could choose the same GF resource which results in high interference at the cell edge scenario.
  The uplink resources collides at cell edge resulting in high interference for URLLC transmission due to resource reuse in deployments.
  Coordinating UL Pre-emption Indication (ULPI) among gNBs is difficult due to the time criticality.

In addition, the conventional contention based SL resource reservation schemes have the following disadvantages:
  A sensing based resource selection method is not optimal for aperiodic traffic pattern due to random or poison traffic arrival.
  In the sensing methods, the selection window methodology of resource selection method also increases the end to end latency, which is not optimum for the low latency traffic type.
  The sidelink grant free transmission suffers from resource collision and considering the different transmission patterns (e.g., the configured set of resources for the transmission) are used by the UEs to avoid the collision. For example, in the released 15/16 standard, if the number of available transmission pattern sets are smaller than the number of UEs. In an out of coverage scenario, where the UEs are preconfigured, it increases the resource collision where two or more UEs chooses the same transmission pattern.

Furthermore, in the case of the UL resource reservation scheme, the "Release 15" solutions for improving the GF transmission, and the GB URLLC transmission have many disadvantages that can be summarized as follow:
  The GF transmission is commonly affected with the resource collision which affects both the reliability, and not meeting the bounded latency.
  For the GB URLLC, the processing timeline for the UL Pre-emption Indication (ULPI) is sent on Downlink (DL) control channel processing to the ULPI based on the Physical Downlink Control Channel (PDCCH) which is not suitable for the low latency use case of eV2x and industrial automation, where the URLLC uplink is always time critical.

FIG. 15 schematically illustrates an UL resource reservation scheme 1500, according to prior art.
  Latency is more: because the ULPI 1501 is sent via the DL control channel and SR processing.
  Preemption in UL is highly time critical.
  Also High reliability required for the ULPI 1501.

In addition, in the case of the contention based SL resource reservation scheme, the disadvantages of the "Release 15" solutions can be summarized as:
  The Long Term Evolution (LTE) V2x uses a sensing based solution for resource selection where it applies a selection window of approximately 10 ms for selecting the resources based on the sensed energy values.
  However this solution is not suitable for a low latency aperiodic traffic communication due to the fact that shortening the selection window reduces the number of the available resources to choose from, which consequently increases the blocking rate. Therefore, the sensing based resource selection is good for periodic traffic type.
  The contention based GF scheme for sidelink aperiodic traffic may be used for the low latency aperiodic traffic. However, sometime the collisions on the same GF resource may affect the reliability of the sidelink V2V communication.
  Transmission pattern are used by the UEs to avoid collision in "Release 15/16" standard. However, if the number of the available transmission pattern sets are smaller than the number of the UEs and in the out of coverage scenario, where the UEs are preconfigured, it increases the resource collision, for example, where two or more UEs chooses the same transmission pattern.

SUMMARY

In view of the above-mentioned problems and disadvantages, the present disclosure aims to improve devices and methods for providing an UL and/or SL resource reservation scheme. An objective is thereby to provide a wireless communication device, a network device, a method of the wireless communication device, and a method for the network device, which help to reduce resource collisions.

The objective of the present disclosure is achieved by the solution provided in the enclosed independent claims. Advantageous implementations of the present disclosure are further defined in the dependent claims.

A first aspect of the disclosure provides a wireless communication device (e.g., a UE) configured to select and reserve a specific resource or a specific transmission pattern for a predetermined time period, send, to at least one other UE, a sidelink control message using a determined sidelink resource, the sidelink control message indicating the selected specific resource or specific transmission pattern; and transmit an uplink or sidelink data message using the selected specific resource or specific transmission pattern.

For example, as the sidelink control message a Sidelink Pre-Indicator (SPI) message) may be sent. In some embodiments, a low latency broadcast or groupcast control message may be sent, e.g., via the sidelink control channel to enhance the reliability of the UL GF transmission which may be like: Listen and Decode Control Channel Before Transmission (LDCCHBT). Moreover, a cooperative uplink resource reservation scheme for the URLLC and the eMBB coexistence may be provided. Furthermore, the UL GF reliability may be improved, e.g., by reducing the collision on the GF resource with the SPI message.

In some embodiments, a low latency broadcast or groupcast control message may be sent, e.g., via the sidelink control channel to enhance the reliability of the SL GF transmission by selection and reservation of certain grant free resource for a period of time. Moreover, the SL GF reliability may be improved by, e.g., reducing the collision on the GF resource with the SPI.

In an implementation form of the first aspect, the specific resource or the specific transmission patterns is from a pre-configured resources set or transmission pattern set.

This is beneficial, since it may improve the UL GF reliability by, for example, reducing collisions on the GF resource with the SPI message. For instance, the wireless communication device may send an urgent uplink URLLC data transmission in a preconfigured resource (e.g., the RRC configured grant type 1, where the grant free resource are preconfigured). The SPI message may be sent to nearby UEs and it may be related to selection and reservation of certain grant free resource or transmission pattern for a period of time. Moreover, the pre-configured resources set or the transmission pattern set may be configured. e.g., by the BS, to listen to the SPI message.

In a further implementation form of the first aspect, the sidelink control message is sent to the at least one other UE: via a Physical Sidelink Control Channel (PSCCH), or via a broadcast signaling or a groupcast signaling indicating Listen and Decode Control Channel Before Transmission (LDCCHBT).

This is beneficial, since the sidelink control message may be sent, e.g., to the nearby UEs and by the PSCCH or the LDCCHBT.

In a further implementation form of the first aspect, the wireless communication device is further configured to select an occasion for the sidelink control message from a set of determined occasions being provided by a network device (e.g., a Base Station (BS)), in particular wherein the set of determined occasions is pre-configured.

For example, in some embodiments, e.g., when in coverage, the BS may provide the set of determined occasions and when out of coverage the set of determined occasions can be pre-configured.

Moreover, the occasion for the sidelink control message may be selected based on a random parameter, when it is determined that the number of UEs in the groupcast signaling is greater than the number of occasions in the set of determined occasions; or a UE-specific configuration, when it is determined that the number of UEs in the groupcast signaling is less than the number of occasions in the set of determined occasions.

In a further implementation form of the first aspect, the wireless communication device is further configured to listen to at least one other UE to receive a sidelink control message indicating a specific resource or a specific transmission pattern being selected and reserved by the least one other UE for a predetermined time period.

This is beneficial, since the collision on the GF resource may be reduced and the reliability of the UL GF resources may be improved. For example, the at least one other UE may select and reserve a specific resource or a specific transmission pattern. Moreover, the at least one other UE may send the SPI message, e.g., to the wireless communication device that may be located nearby to the at least one other UE. The SPI message may indicate the selected specific resource or the selected specific transmission pattern. Moreover, the collision on the GF resources may be reduced, and the UL GF reliability may be improved.

In a further implementation form of the first aspect, the wireless communication device is further configured to receive a conflict resolution message from yet another UE, indicating information that the UE and the at least one other UE selected and/or reserved the same specific resource or the same specific transmission pattern for the predetermined time period.

This is beneficial, since the reliability of the SPI reception may be improved, for example, the conflict resolution for the SPI may improve the reliability of the SPI control message, e.g., by solving the half duplex constraint.

In a further implementation form of the first aspect, the wireless communication device is further configured to listen to at least one other UE served by the same BS as the UE and to at least one other UE served by a neighboring BS to receive sidelink control messages.

This is beneficial, since the cell edge interference may be reduced and the performance of the cell edge URLLC UEs may further be improved.

In a further implementation form of the first aspect, the wireless communication device is further configured to determine that at least one other UE selected and/or reserved the same specific resource or specific transmission pattern for the same time period, and send, to the at least one other UE, the sidelink control message including an instruction.

This is beneficial, since the instruction may be sent which may improve the UL GF transmission inside the GB resource of the same and other UEs. For instance, when a UE wants to UL a GF transmission inside a grant based resources, the interference from neighboring UEs overlapping the uplink transmission may be considered.

In a further implementation form of the first aspect, the instruction includes one or more of:

A notification command requesting the at least one other UE to cancel uplink or sidelink data message scheduled in the specific resource and/or an overlapped resource of a transmission of the at least one other UE.

A notification command requesting the at least one other UE to reduce the power of the uplink or sidelink data message transmitted in the specific resource.

A detailed configuration of the UE specific Channel State Information-Reference Signals, CSI-RS, of a serving beam and/or a candidate beam of a beam based transmission scheme.

A relative timing advance.

This is beneficial, since different types of the instructions may be provided which may improve the UL GF reliability, etc.

In a further implementation form of the first aspect, the sidelink control message indicates an uplink grant free transmission in one or more UL Bandwidth Parts (BWPs).

For example, the wireless communication device or the other UEs may send the SPI which may indicate one or more UL BWPs. Moreover, the collision on the GF resources may be reduced, avoided, etc.

In a further implementation form of the first aspect, the UL GF transmission is further included in a Grant Based (GB) resource of an enhanced Mobile Broadband (eMBB).

This is beneficial, since it may improve the UL GF transmission inside the GB resource of the same and other UEs.

A second aspect of the present disclosure provides a network device (e.g., a BS) configured to provide a specific resource or a specific transmission pattern for a predetermined time period to a UE, provide a sidelink resource to the UE for sending a sidelink control message, and obtain an uplink data message from the UE in the specific resource or according to the specific transmission pattern.

This is beneficial, since the BS may provide, e.g., the specific resource, the specific transmission pattern, or the sidelink resource to the UE for sending the sidelink control message. Moreover, a low latency broadcast or groupcast control message may be sent, e.g., via the sidelink control channel to enhance the reliability of the uplink grant free transmission. Moreover, a low latency broadcast or groupcast control message may be sent, e.g., via the sidelink control channel to enhance the reliability of the sidelink grant free transmission.

In an implementation form of the second aspect, the specific resource or the specific transmission patterns is from a pre-configured resources set or transmission pattern set.

This is beneficial, since it may improve the UL GF reliability by, for example, reducing collisions on the GF resource with the SPI message.

In a further implementation form of the second aspect, the network device is further configured to coordinate, with at least one other BS, the sidelink resource to be the same for each BS.

This is beneficial, since the serving and neighbouring BSs may need to exchange (e.g., coordinate) the sidelink control channel resource (e.g., for the SPI) to help the URLLC cell edge UEs to get more reliability.

In a further implementation form of the second aspect, the network device is further configured to coordinate, with the at least one other BS, a set of specific resources or specific transmission patterns to be different for each BS.

This is beneficial, since the cell edge interference may be reduced and the performance of the cell edge URLLC UEs may be improved.

A third aspect of the present disclosure provides a method for a wireless communication device (e.g., a UE) the method comprising selecting and reserving a specific resource or a specific transmission pattern for a predetermined time period; sending, to at least one other UE, a sidelink control message using a determined sidelink resource, the sidelink control message indicating the selected specific resource or selected specific transmission pattern; and transmitting an uplink or sidelink data message using the selected specific resource or specific transmission pattern.

In an implementation form of the third aspect, the specific resource or the specific transmission patterns is from a pre-configured resources set or transmission pattern set.

In a further implementation form of the third aspect, the sidelink control message is sent to the at least one other UE, via a Physical Sidelink Control Channel (PSCCH) or via a broadcast signaling or a groupcast signaling indicating Listen and Decode Control Channel Before Transmission (LDCCHBT).

In a further implementation form of the third aspect, the method further comprising selecting an occasion for the sidelink control message from a set of determined occasions being provided by a network device (e.g., a BS) in particular wherein the set of determined occasions is pre-configured.

In a further implementation form of the third aspect, the method further comprising listening to at least one other UE to receive a sidelink control message indicating a specific resource or a specific transmission pattern being selected and reserved by the least one other UE for a predetermined time period.

In a further implementation form of the third aspect, the method further comprising receiving a conflict resolution message from yet another UE, indicating information that the UE and the at least one other UE selected and/or reserved the same specific resource or the same specific transmission pattern for the predetermined time period.

In a further implementation form of the third aspect, the method further comprising listening to at least one other UE served by the same BS as the UE and to at least one other UE served by a neighboring BS to receive sidelink control messages.

In a further implementation form of the third aspect, the method further comprising determining that at least one other UE selected and/or reserved the same specific resource or specific transmission pattern for the same time period, and send, to the at least one other UE, the sidelink control message including an instruction.

In a further implementation form of the third aspect, the instruction includes one or more of:
  A notification command requesting the at least one other UE to cancel uplink or sidelink data message scheduled in the specific resource and/or an overlapped resource of a transmission of the at least one other UE.
  A notification command requesting the at least one other UE to reduce the power of the uplink or sidelink data message transmitted in the specific resource.
  A detailed configuration of the UE specific Channel State Information-Reference Signals, CSI-RS, of a serving beam and/or a candidate beam of a beam based transmission scheme.
  A relative timing advance.

In a further implementation form of the third aspect, the sidelink control message indicates an uplink grant free transmission in one or more UL Bandwidth Parts (BWPs).

In a further implementation form of the third aspect, the UL GF transmission is further included in a Grant Based (GB) resource of an enhanced Mobile Broadband (eMBB).

A fourth aspect of the present disclosure provides a method for a network device, the method comprising providing a specific resource or a specific transmission pattern for a predetermined time period to a UE, providing a sidelink resource to the UE for sending a sidelink control message, and obtaining an uplink data message from the UE in the specific resource or according to the specific transmission pattern.

In an implementation form of the fourth aspect, the specific resource or the specific transmission patterns is from a pre-configured resources set or transmission pattern set.

In a further implementation form of the fourth aspect, the method further comprising coordinating, with at least one other BS, the sidelink resource to be the same for each BS.

In a further implementation form of the fourth aspect, the method further comprising coordinating, with the at least one other BS, a set of specific resources or specific transmission patterns to be different for each BS.

In some embodiments, a low latency broadcast or groupcast control message, via sidelink control channel may be sent, e.g., to enhance the reliability of the uplink grant free transmission.

In some embodiments, a low latency broadcast or groupcast control message may be sent, via the sidelink control channel, e.g., to enhance the reliability of the sidelink grant free transmission by selection and reservation of certain grant free resource or transmission pattern for a period of time. Moreover, the reliability of the GF transmission for the UL and SL may be improved (e.g., by sending the Sidelink Pre-Indicator (SPI) message), which may have the advantages of the low latency aspect of the SPI transmission and the resource utilization, e.g., utilization of the grant free resources. The main advantages and a brief discussion of them, can be summarized in Table I, as follows:

TABLE I

Main advantages of the Grant Free URLLC with SPI (the present disclosure).

| Transmission scheme | Latency | Reliability | Resource utilization |
|---|---|---|---|
| Grant based (GB) URLLC | High latency involved Cycle 1: UE→gNB, depends on SR transmission periodicity Cycle 2: gNB→UE, UL grant sent in DCI Cycle 3: UE→gNB, URLLC transmission | Highly reliable: but also depends on following factors: Contention based SR with different cyclic shifts Dedicated SR resource for a UE | Medium: following factors: Performance depends on the SR decoding performance Reservation for dedicated SR with less periodicity consumes extra resource |
| Grant Free (GF) URLLC | Low Latency involved Cycle 1: UE→gNB, URLLC transmission | Less reliable due to collision But also depends on the following factors: k repetition, T/F hopping, different RV pattern Even for Resources > no of UE, UE with same hopping pattern could still collide | Low: following factors: contention based scheme with repetition consumes more resources Non-coordinated UL URLLC Tx results in collisions and also underutilization of un-used GF resources |
| Grant Free URLLC with SPI (Present Disclosure) | Low Latency involved Cycle 1 assistance: UE→UE, SPI via Pc5 Cycle 1: UE→gNB, URLLC transmission (UL URLLC Tx is done even SPI is not successful) | High reliability (higher than GF lower than or equal to GB) due to resource reservation, but also depends on the following factors: SPI resources and periodicity is configured per group PSCCH periodicity aligned with UL GF | Medium: following factors: Performance depends on the SPI decoding performance Successful SPI minimizes the need for repetition as opposed to GF Coordination with SPI avoids UL URLLC collisions which increases the utilization of GF resources |

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which FIG. 1 schematically illustrates an embodiment of a wireless communication device, particularly UE, and a base station, according to an embodiment of the present disclosure.

DETAILED DESCRIPTION OF EMBODIMENTS

Figure 1:
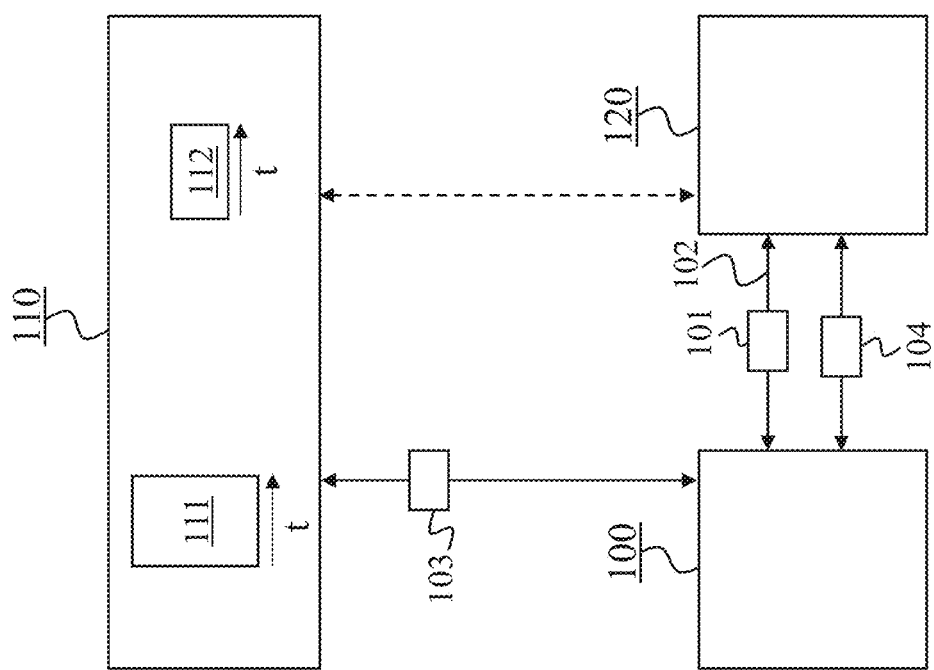

FIG. 1 schematically illustrates a wireless communication device according to an embodiment of the disclosure, particularly a UE 100, and a network device, particularly a base station 110, according to an embodiment of the disclosure.

The wireless communication device 100 is configured to select and reserve a specific resource 111 or a specific transmission pattern 112 for a predetermined time period t.

The wireless communication device 100 is further configured to send, to at least one other UE 120, a sidelink control message 101 using a determined sidelink resource 102, the sidelink control message 101 indicating the selected specific resource 111 or specific transmission pattern 112. The wireless communication device 100 is further configured to transmit an uplink 103 or sidelink data message 104 using the selected specific resource 111 or specific transmission pattern 112.

The network device 110 may be a BS (e.g., in the cases of NR-Uu) or another UE 110 (e.g., in the cases of the NR Pc5) is configured to provide a specific resource 111 or a specific transmission pattern 112 for a predetermined time period (i.e., t) to a UE 100.

In the following, in some embodiments, the network device 110 is a BS device, in the cases of the NR-Uu. Furthermore, in the cases of the NR Pc5, the network device 110 is based on the UE 110, without limiting the present disclosure to a specific configuration or a specific function of the network device 110.

The network device 110 (which may be the BS 110 in the cases of NR-Uu or the UE 110 in the case of the NR Pc5) is further configured to provide a sidelink resource 102 to the UE 100 for sending a sidelink control message 101. The network device 110 is further configured to obtain an uplink data message 103 from the UE 100 in the specific resource 111 or according to the specific transmission pattern 112.

For example, a cooperative uplink resource reservation scheme may be provided, e.g., for the URLLC and the eMBB coexistence. Moreover, a low latency broadcast or groupcast control message may be sent, e.g., via the sidelink control channel to enhance the reliability of the uplink grant free transmission.

In some embodiments, the nearby UEs may be the major source of interferer for the uplink grant free URLLC transmissions. For example, when a UE 100 needs to send an urgent uplink or sidelink URLLC data transmission 103 in a preconfigured resource 111, the UE 100 sends a low latency sidelink pre indicator message (SPI) 101. The SPI message 101 may be sent via the PSCCH to the nearby UE 120, about selection and reservation of certain grant free resource 111 or transmission pattern 112, for a period of time. The particular uplink grant free resource 111, the sidelink UE 120 are configured to listen to the SPI message 101. The UL or SL GF reliability may be improved, e.g., by reducing the collision on the GF resource 111 with sending the SPI message 101.

Moreover, a low latency broadcast or groupcast control message may be sent, e.g., via the sidelink control channel which may enhance the reliability of the sidelink grant free transmission by selection and reservation of certain grant free resource for a period of time.

For example, when a UE 100 wants to send an urgent sidelink URLLC data transmission 104 in a preconfigured resource, the UE 100 sends a low latency sidelink pre indicator message (SPI) 101 via the PSCCH to the nearby UE 120, where the sidelink data and the sidelink control channel resource may be in the same or a different carrier. Moreover, in the case of the sidelink data and the sidelink control channel resource being in a difference carrier, the SPI message may indicate the carrier identifier. The SPI message may indicate the selection and reservation of the certain grant free resource or the transmission pattern for a period of time. The particular sidelink grant free resource, the sidelink UE 120 are configured to listen to the SPI message 101. Moreover, the SL GF reliability may be improved by reducing the collision on the GF resource with the SPI.

Figure 2:
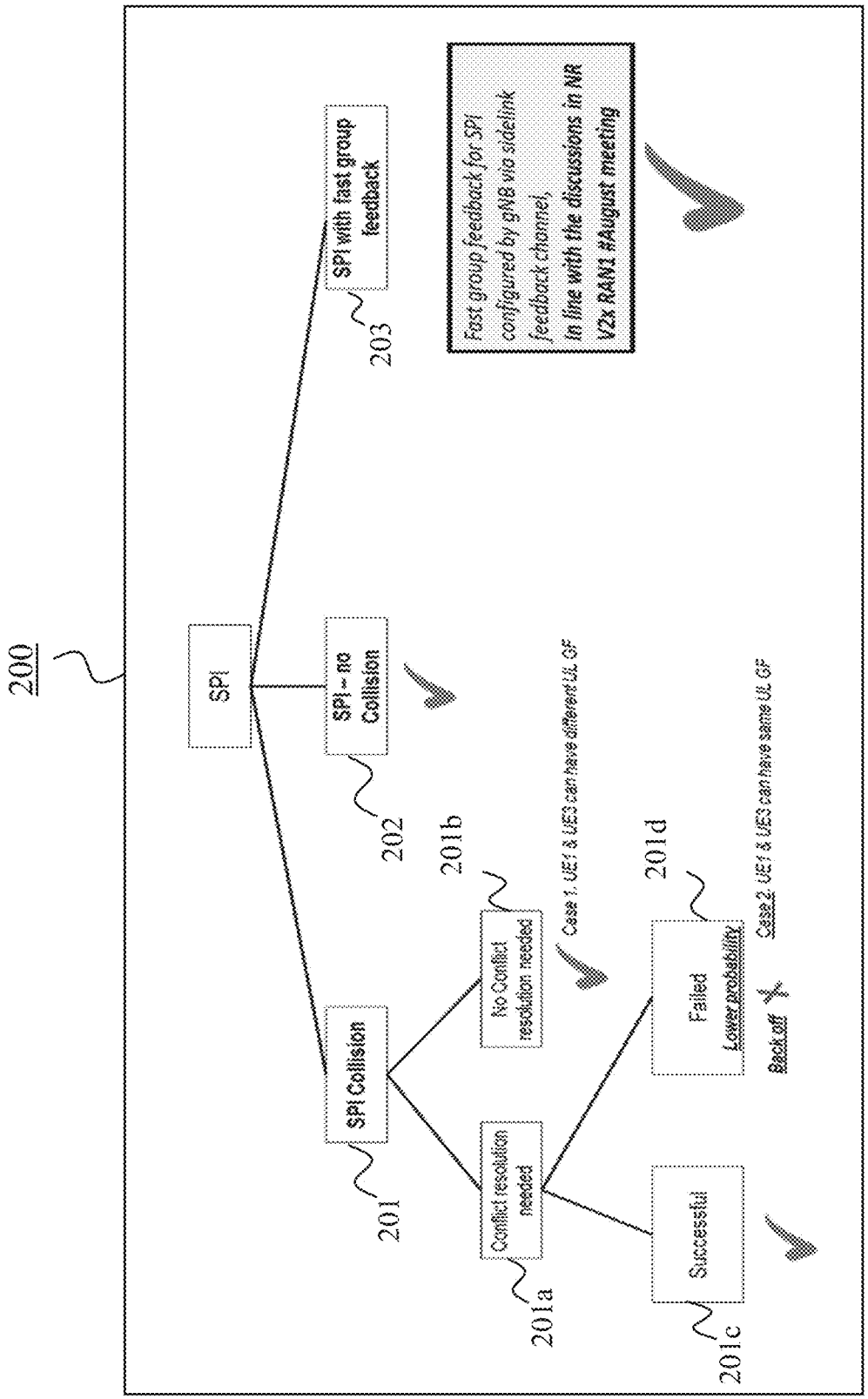
FIG. 2 schematically illustrates exemplary procedures for improving the reliability of the sidelink pre-indicator (SPI) reception, according to various embodiments of the present disclosure.

FIG. 2 schematically illustrates exemplary procedures for improving the reliability of the sidelink pre-indicator (SPI) reception, according to various embodiments of the present disclosure.

To improve the reliability of the SPI reception, conflict resolution for the SPI is proposed. The conflict resolution procedure may improve the reliability of the SPI control message, for example, by solving the half duplex constraint and the collisions of the SPI.

In some embodiments, there may be an SPI collision 201. In some embodiments, no conflict resolution procedure 201b is needed, for example, when two UEs can have different UL or SL GF resources.

Moreover, in some cases a conflict resolution procedure 201a may be required. For example, the conflict resolution may be solved and may further be successful 201c or the conflict resolution may fail 201d. A failed process 201d in the conflict resolution has a lower probability, and it may represent a back off command, e.g., when two UEs can have the same UL or SL GF or the transmission pattern configuration.

Furthermore, in some embodiments, the SPI with fast group feedback 203 may be sent. For example, the fast group feedback for the SPI may be configured by the network device 110 (e.g., the gNB 110 or the UE 110) via the sidelink feedback channel.

Figure 3:
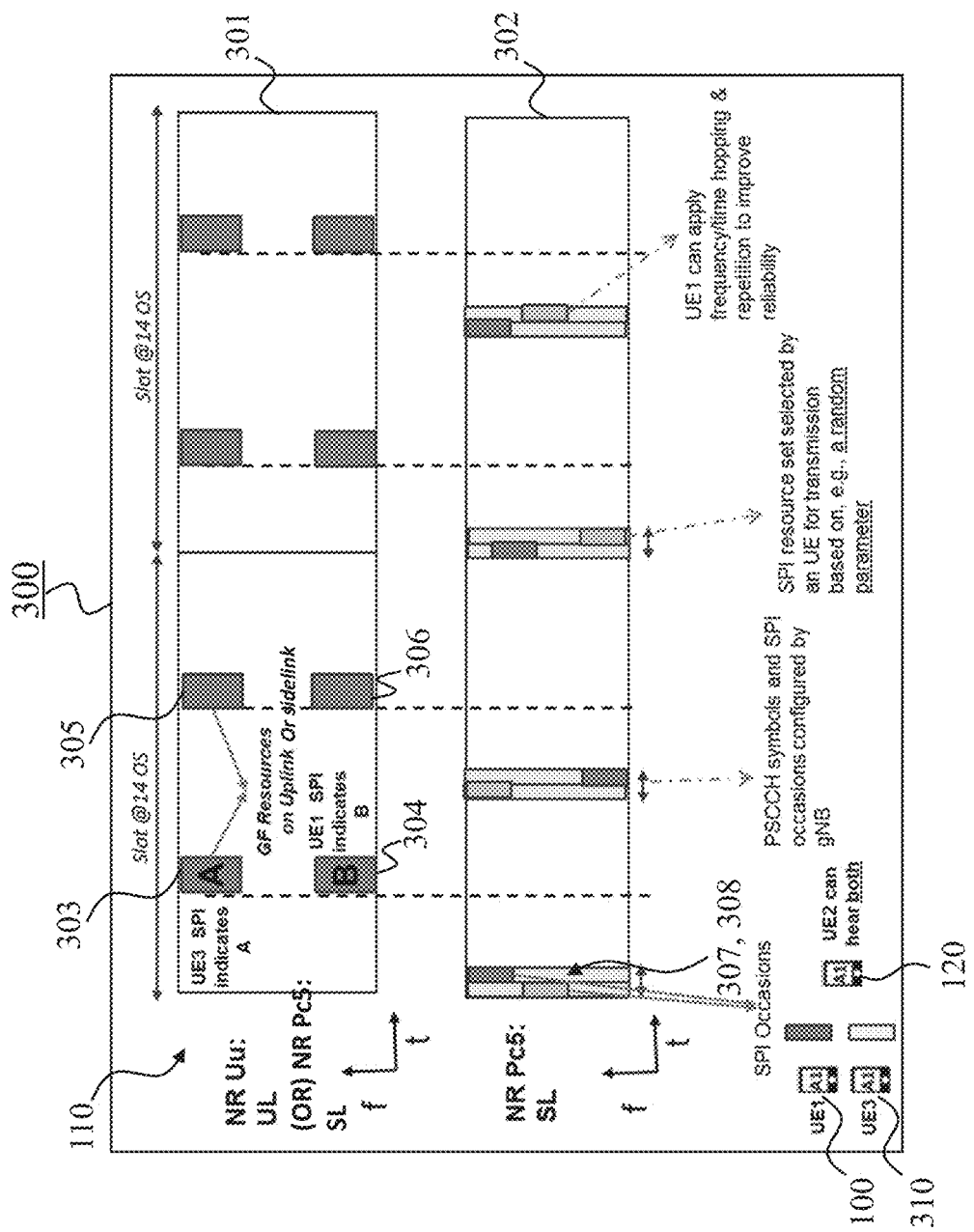
FIG. 3 illustrates a schematic view of an exemplary resource reservation system, according to various embodiment of the present disclosure.

FIG. 3 illustrates a schematic view of an exemplary resource reservation system 300, according to various embodiments of the present disclosure. The system 300 exemplary is configured for a resource reservation scheme for the URLLC/eMBB coexistence. Moreover, a low latency broadcast or groupcast control message may be sent, e.g., via the sidelink control channel to enhance the reliability of uplink grant free transmission.

The system 300 includes the UE1 100, the network device 110 (which may be the BS/gNB 110 in the cases of NR-Uu or the UE 110 in the case of the NR Pc5), the UE2 120, and the UE3 310. The system 300 further includes a 2D frame scheme 301 (e.g., including slot configuration) in time and frequency domain, for the NR Uu: UL or NR Pc5: SL, which includes the resources 303, 304, 305, and 306. Moreover, the system 300 further includes a 2D frame scheme 302 in time and frequency domain, for the NR Pc5: SL, which includes the SPI occasions 307, 308 (e.g., the UE1 100 has the SPI 307, and the UE3 310 has the SPI 308).

For example, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In some embodiments, the nearby UEs 100, 120, and 310 may be the major source of interferer for uplink grant free URLLC transmission. Moreover, the UL GF reliability may be improved by reducing collision on the GF resource 303, 304, 305, and 306 with the SPI.

For example, when a UE 100 wants to send an urgent uplink URLLC data transmission in a preconfigured resource (e.g., the RRC configured grant type 1, where the grant free resource 303, 304, 305 and 306 are preconfigured), the UE 100 sends a low latency sidelink pre indicator message (SPI) 307 via sidelink control channel (PSCCH) via broadcast or groupcast to the nearby UEs 120, and 310 about selection and reservation of certain grant free resource 304 transmission pattern for a period of time, the particular uplink grant free resource 304, the sidelink UEs 120, 310 are configured to listen to the SPI messages 307, by the gNB 110.

For example, the UEs 100, 120, and 310 in the group are configured for the SPI occasions 307 in the PSCCH, by the gNB 110. Moreover, the time and frequency hopping for the SPIs 307 and 308 may reduce the collisions.

Moreover, the UEs 100, 120, and 310 may select the SPI occasion (e.g., the resource set for the SPI transmission), for example, based on a random parameter being specified by the standard (e.g., based on a hash function using Linear Congruential Method), if the number of the UEs in the group are greater than the number of the SPI occasions or a UE-specific configuration, if the number of the UEs in the group are less than the number of the SPI occasions.

TABLE II

Possible enhancement to the SCI format, for the
resource selection and reservation, as
a part of the transmitting the SPI message via the PSCCH.

| Indication | 14 bits | Grant Free resource reservation: granularity of time-frequency resources configured by higher layer parameter |
|---|---|---|
| Repetition (k) | X bits | UE configured with k repetition factor, other UEs can avoid these resources |
| Interval | X bits | GF resources reserved for a number of slots, other UEs can avoid these resources |
| Hopping pattern | X bits | Configured Hopping pattern, other UE can avoid these resources |
| Back off | X bits | If UE cannot resolve conflict resolution |

Furthermore, the sidelink SPI 307 indicates UL GF transmission in one or more UL BWPs. The UE1 SPI 307 has indicated the GF Resource B 304, and the UE3 SPI 308 has indicated the GF Resource A 303. Note that, the UE1 100 can listen to the UE3 310 and UE3 310 can listen to the UE1 100. Table II shows the possible enhancement to the SL Control Information (SCI) Format, for the resource selection and reservation, as a part of the transmitting the SPI message via PSCCH.

Figure 4A:
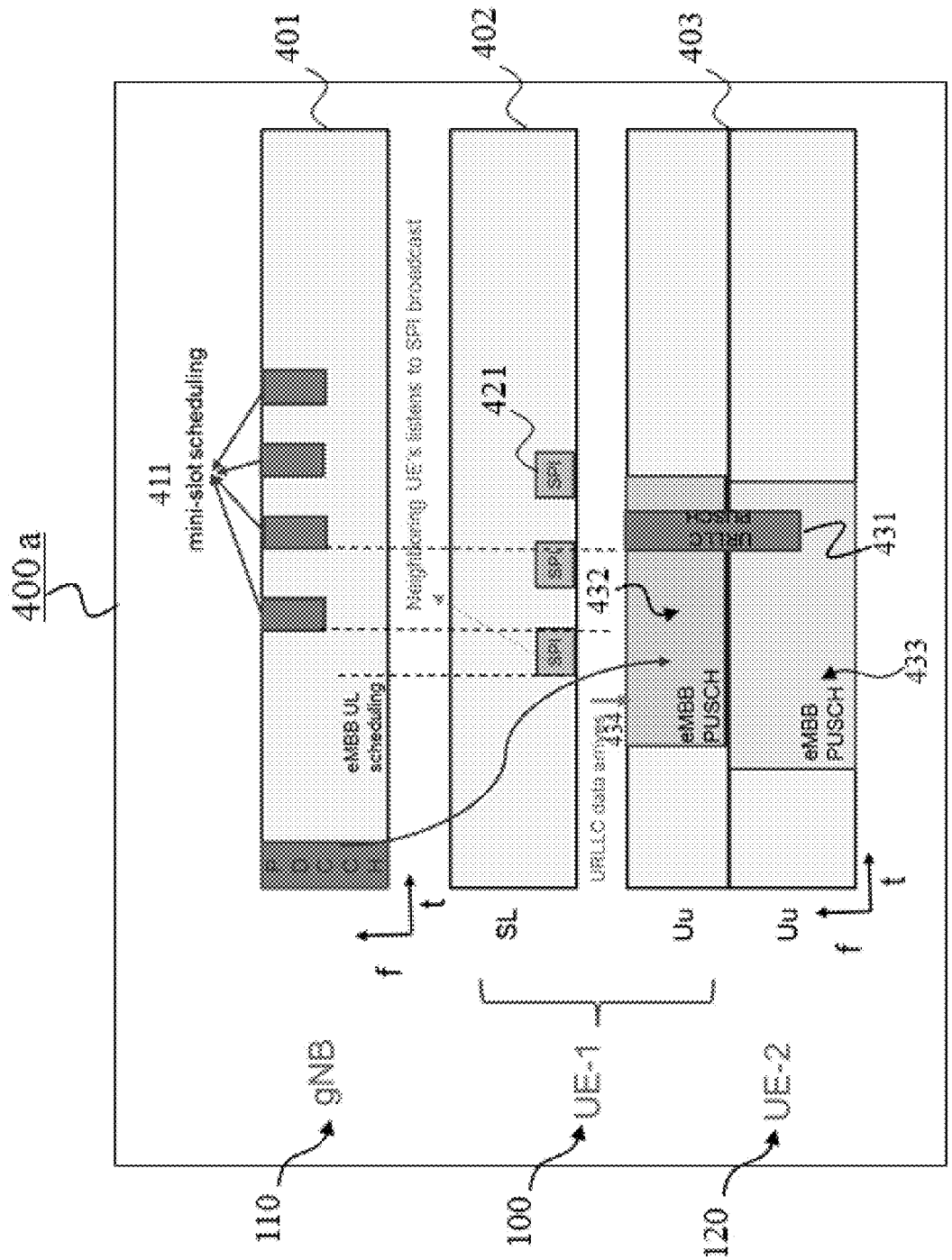
FIG. 4a and FIG. 4b illustrate a schematic view of an exemplary system for providing an UL GF transmission inside a GB resource, and a schematic view of an exemplary system for providing an SL GF transmission inside a GB resource, respectively, according to various embodiments of the present disclosure.

FIG. 4a illustrates a schematic view of an exemplary system 400a for providing an UL GF transmission inside a GB resource, according to various embodiments of the present disclosure.

The system 400a includes the UE1 100, the gNB 110, and the UE2 120. The system 400 further includes a 2D PDCCH frame scheme 401 in time and frequency domain, including several mini-slots 411 adapted for scheduling. The network device 110 may be the BS 110 in the cases of NR-Uu or the UE 110 in the case of the NR Pc5.

Moreover, the system 400 further includes a 2D SL frame scheme 402 in time and frequency domain, including several SPI messages such as the SPI message 421 of the UE1 100.

The system 400 further includes a 2D Uu frame scheme 403 in time and frequency domain, including information of an URLLC PUSCH 431, information of an eMBB PUSCH 432 of the UE1 100, and information of the eMBB PUSCH 433 of the UE2 120.

In some embodiments, the UL GF transmission inside GB resource of same and other UEs may be improved. For example, when the UE1 100 wants to UL GF transmission inside a grant based resources. In such a case, the interference from neighboring UEs 120 overlapped the uplink transmission should be considered. This can be achieved by sending the sidelink pre indicator message (SPI) via the sidelink control channel (PSCCH), e.g., via broadcast or groupcast to nearby UEs 120. For example, the UE1 100 may send the SPI message which may include a notification command requesting the UE2 120, to cancel the scheduled eMBB transmission 433 happening in the overlapping resources or reduce the power of the eMBB transmission 433 to aid the reliability for the URLLC UE's UL data transmission.

Moreover, in the case of beam based transmission scheme, the SPI may include a detailed configuration of the UE specific channel-state information reference signal (CSI-RS) of the serving beam and candidate beam.

When an URLLC data 434 arrives, the UE1 100 calculates its uplink or sidelink overlapping resource, and it further broadcast this information via the sidelink preemption indicator (SPI), e.g., 421, to the other neighboring UEs 120. The SPI message 421 of the UE1 100 includes a detailed information about one or more of:

The serving and configured UE specific CSI-RS of the serving beam and the candidate beam.

The UL or SL overlapping resource with other UEs.

A notification command, e.g., a cancel command or a relative power offset control command for the neighboring UEs uplink data transmission.

A relative timing advance.

Table III represents the SL Control Information (SCI) format, for sending the SPI message via the PSCCH, and being used for preemption like technique for the URLLC/eMBB coexistence.

TABLE III

The SCI Format for sending the SPI message via the PSCCH.

| | |
|---|---|
| SL INT RNTI | Notifying a group of UEs where the UE may assume no uplink transmission or reduced power is intended for the UE |
| Pre Indication | 12 to 14 bits, an indication of the overlapping time frequency resources and the relative symbol offset for the UL URLLC transmission |
| CSI-RS configuration | The serving and the configured UE specific CSI-RS of the serving beam and candidate beam |
| Notification command | The command could be either preemption of ongoing transmission or reducing Tx power |
| TA | Timing advance of the UE |

Figure 4B:
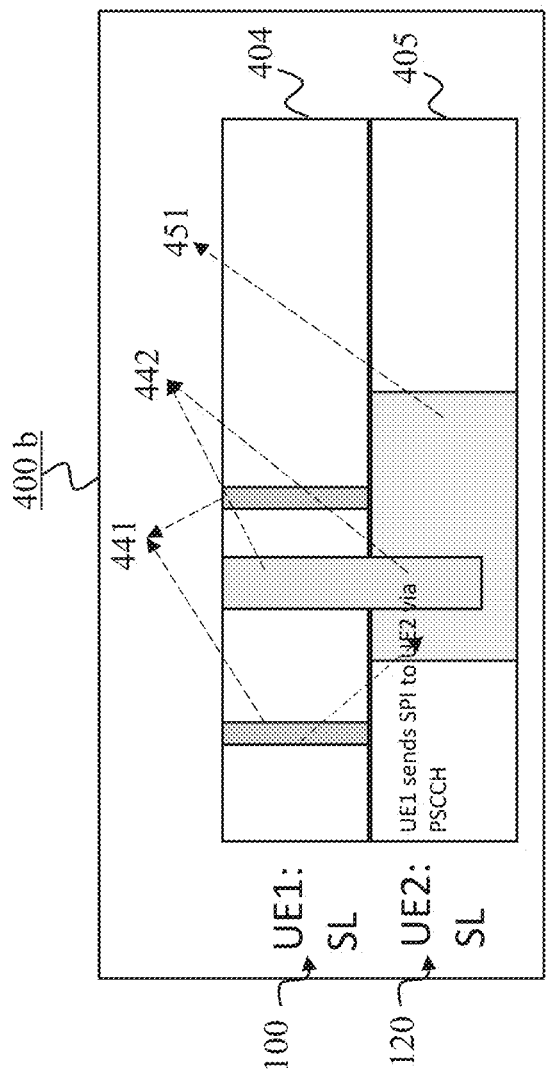

FIG. 4b illustrates a schematic view of an exemplary system 400b for providing an SL GF transmission inside a GB resource, according to various embodiments of the present disclosure.

The system 400b includes the UE1 100, and the UE2 120. The system 400 further includes a 2D SL frame scheme 404 of the UE1 100, in time and frequency domain, including SPI occasions 441 and the urgent SL transmission 442 which is partially or fully overlapped with other UEs resources (i.e., the resource 451 of the SL frame 405 of the UE2 120).

Moreover, the system 400b further includes a 2D SL frame scheme 405 of the UE2 120, in time and frequency domain, including the not-urgent SL transmission 451 from the UE2 120.

Furthermore, the UE1 100 preempts or notify the UE2 120 about the SL overlapping resources. The UE2 120 may stop the transmission or the UE2 120 may reduce the power of transmission.

Figure 5:
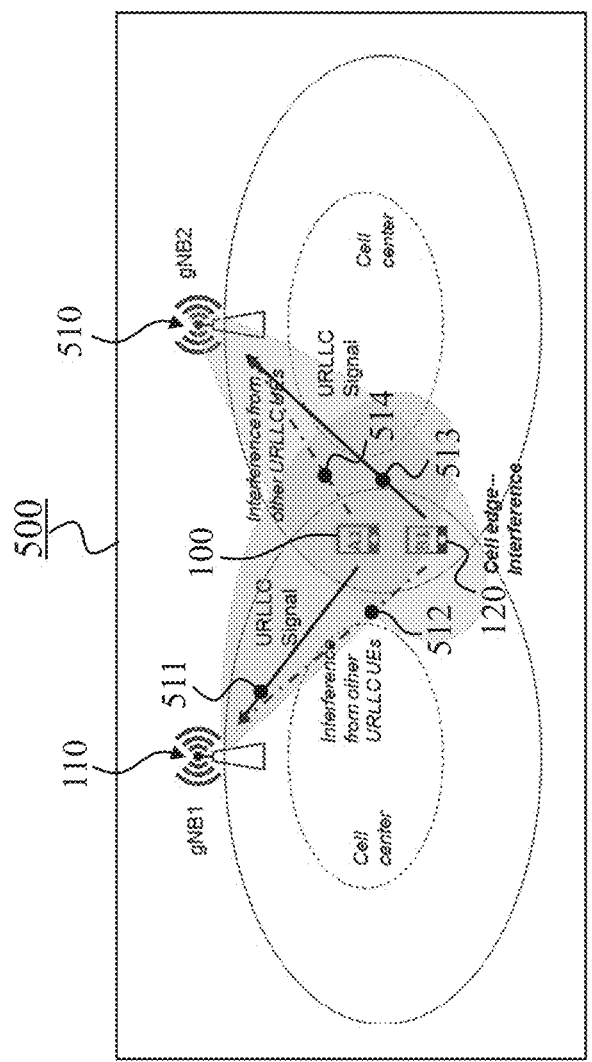
FIG. 5 illustrates a schematic view of an exemplary system for improving the performance of the cell edge URLLC UEs and minimizing the cell edge interference, according to various embodiments of the present disclosure.

FIG. 5 illustrates a schematic view of an exemplary system 500 for improving the performance of the cell edge URLLC UEs and minimizing the cell edge interference, according to various embodiments of the present disclosure.

The system 500 includes the UE1 100, the UE2 120, the first base station of gNB1 110, the second base station of gNB2 510. The UE1 100 send an URLLC signal 511 to the gNB1 110 which is interfered by the URLLC signal 512 of the other UEs in the system, e.g., the UE2 120. Similarly, the UE2 120 send an URLLC signal 513 to the gNB2 510 which is interfered by the URLLC signal 514 of the other UEs in the system, e.g., the UE1 100. The network device 110 may be the BS 110 in the cases of NR-Uu or the UE 110 in the case of the NR Pc5.

The gNB1 110 and the gNB2 510 are the serving base station and the neighboring base station for the UE1 100, respectively. Similarly, the gNB2 510 and the gNB1 110 are the serving base station and the neighboring base station for the UE2 120, respectively.

In order to minimize the cell edge interference and to improve the performance of the cell edge URLLC UEs, the serving and the neighboring gNBs may exchange (e.g., coordinate) the sidelink control channel resource for monitoring of the SPI to help the URLLC cell edge UEs to get more reliability via the Xn (i.e., a priori).

In some embodiments, the coordination of the sidelink control channel resource for monitoring of the SPI among gNBs may be required via the Xn. Moreover, the cell edge UEs may need to listen to both of the serving and the neighboring gNBs SPI to avoid transmission or lower the power for the overlapping resources. In addition, both of the serving and the neighboring gNBs in-turn may need to exchange or coordinate the sidelink control channel resource for monitoring SPI, and to help the URLLC cell edge UEs to get more reliability.

Figure 6:
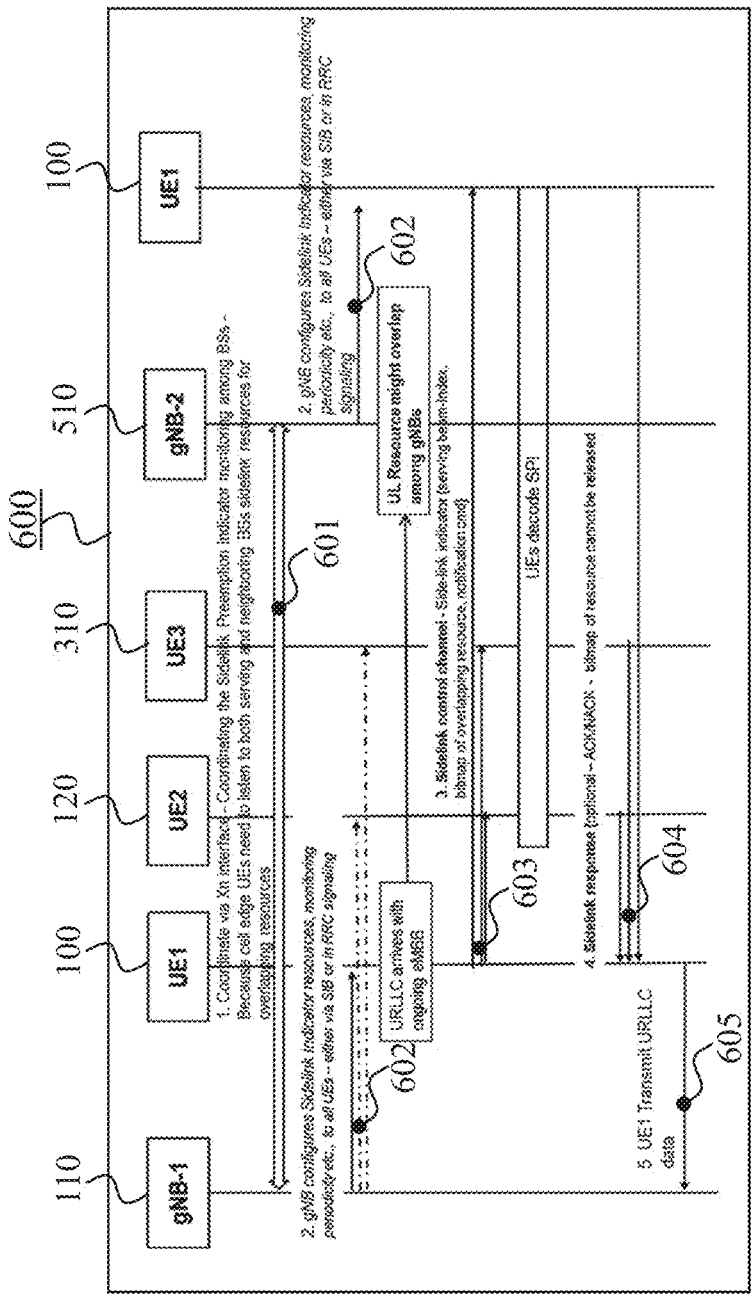
FIG. 6 illustrates a schematic view of an exemplary procedure for improving the performance of the cell edge URLLC UEs and minimizing the cell edge interference, according to various embodiments of the present disclosure.

FIG. 6 illustrates a schematic view of an exemplary procedure 600 for improving the performance of the cell edge URLLC UEs and minimizing the cell edge interference, according to various embodiments of the present disclosure.

The reliability of the grant free (GF) scheme for cell edge URLLC UEs may be improved, for example, by coordinating the Grant-free resources among gNBs such that each gNB provides non-overlapping grant free resource. Moreover, the resource collision or interference at the cell edge may be reduced.

Coordinating the Grant-free (GF) resources among gNBs 110 and 510 is required via Xn interface such that each BS 110 (which may be the BS 110 in the cases of NR-Uu or the UE 110 in the case of the NR Pc5) and 510 provide a unique non-overlapping grant free resource. Providing non-overlapping GF resource may limit the resource collision or interference for cell edge GF URLLC UEs.

The step 601 comprises coordinating via Xn interface, for example, coordinating the sidelink preemption indicator monitoring among BSs, i.e., the gNB1 110 and the gNB2 510. The cell edge UEs need to listen to both serving and neighboring BSs sidelink resources for overlapping resources.

At step 602, the gNB 110, 510 configures the sidelink indicator responses, e.g., monitoring the periodicity, etc., for all of the UEs 100, 120, and 310. Moreover, the URLLC arrives with ongoing eMBB and the UL resource might overlap among gNBs 110 and 510.

The step 603 comprises sending the SPI message via the sidelink control channel. For example, the UE1 100 may send the sidelink indicator message to the UE2 120 and UE3 310, which may include serving beam index, bitmap of overlapping resource, a notification command, etc.

The step 604 comprises the sidelink response, which may be optional and may further include an ACK/NACK message, a bitmap of resource that cannot be released, etc.

At step 605, the UE1 100 transmit URLLC data, for example, to the gNB 110.

Figure 7:
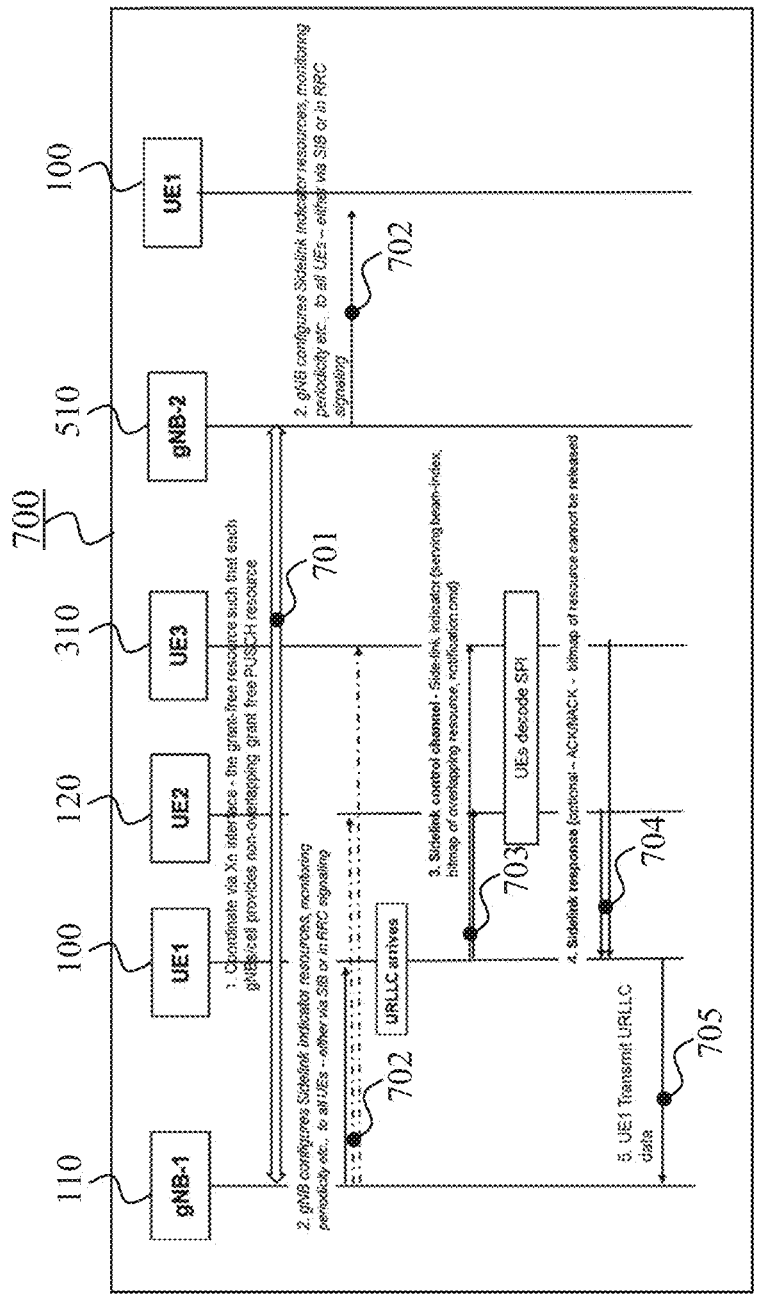
FIG. 7 illustrates a schematic view of an exemplary procedure for improving the reliability of the URLLC, according to various embodiments of the present disclosure.

FIG. 7 illustrates a schematic view of an exemplary procedure 700 for improving the reliability of the URLLC, according to various embodiments of the present disclosure.

In order to avoid using the same grant-free resource among BSs 110, 510. The gNB (e.g., 110) coordinate the grant-free PUSCH resource among neighboring gNB's 510 to avoid overlapping the grant-free resources. This may reduce the interference at the cell edge grant free URLLC UEs. The network device 110 may be the BS 110 in the cases of NR-Uu or the UE 110 in the case of the NR Pc5.

The step 701 comprises coordinating via Xn interface, for example, the grant free resources such that each gNBs/cell provide non-overlapping grant free PUSCH resource.

At step 702, the gNB 110, 510 configures the sidelink indicator responses, e.g., monitoring the periodicity, etc., for all of the UEs 100, 120, either via SIB or in RRC signaling.

The step 703 comprises sending the SPI message via the sidelink control channel. For example, the UE1 100 may send the sidelink indicator message to the UE2 120 and UE3 310, which may include serving beam index, bitmap of overlapping resource, a notification command, etc. Moreover, the UEs may decode the SPI.

The step 704 comprises the sidelink response, which may be optional and may further include an ACK/NACK message, a bitmap of resource that cannot be released, etc.

At step 705, the UE1 transmit URLLC data, for example, to the gNB 110.

Figure 8:
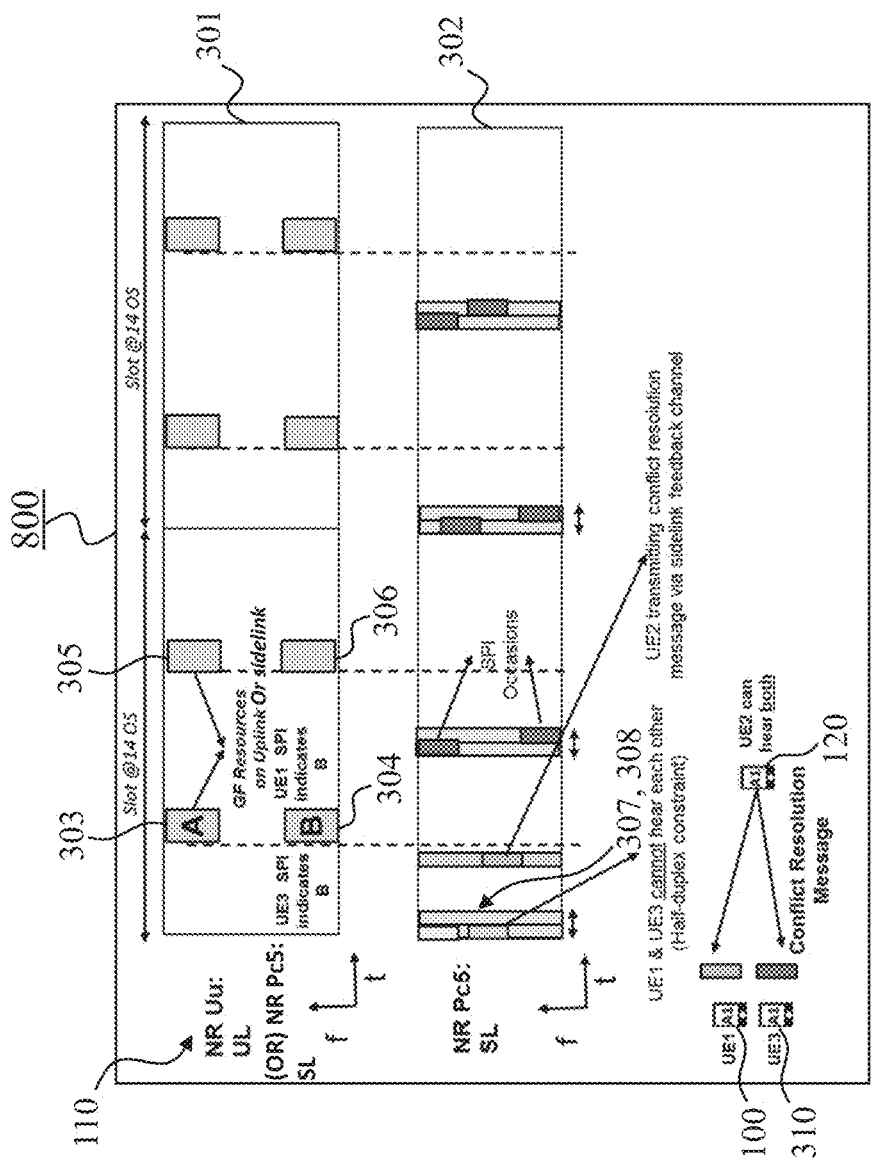
FIG. 8 illustrates a schematic view of an exemplary system for improving the reliability of the SPI reception by providing a conflict resolution message, according to various embodiments of the present disclosure.

FIG. 8 illustrates a schematic view of an exemplary system 800 for improving the reliability of the SPI reception by providing a conflict resolution message, according to various embodiments of the present disclosure.

The system 800 exemplary is configured to provide a conflict resolution message for the SPI to improve the reliability of the SPI control message, e.g., to solve the half duplex constraint and the collision of the SPI.

For example, the network device 110 may be the BS 110 in the cases of NR-Uu or the UE 110 in the case of the NR Pc5. Moreover, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In some embodiments, in order to improve the reliability of the SPI reception, a conflict resolution for the SPI may be provided, for example, to improve the reliability of the SPI control message, e.g., to solve half duplex constraint and the collision of SPI I the following three different cases for the conflict resolution are discussed.

The first case is, for example, when the UE1 100 and the UE3 310 have their SPI transmissions (i.e., 307 and 308) at the same time. Moreover, they cannot hear each other and Half-duplex constraint occurs. Furthermore, UE2 120 can hear both, because UE2 120 only listens to the SPI occasions. Moreover, UE2 120 identifies where the UE1 100 and the UE3 310 want to transmit the UL GF. In this case, the UE1 100 and the UE3 310 have selected different UL GF resources. Therefore, no collision occurs on the UL, and consequently, no intervention by the UE2 120 is required and the SPI works fine, e.g., in its preconfigured condition.

In the second case, with respect to the FIG. 8, for example, when the UE1 100 and the UE3 310 have their SPI transmissions (i.e., 307 and 308) at the same time. Moreover, they cannot hear each other and Half-duplex constraint occurs. Furthermore, UE2 120 can hear both, because UE2 120 only listens to the SPI occasions. UE2 120 identifies where the UE1 100 and the UE3 310 want to transmit their UL GF. In this case, the UE1 100 and UE3 310 have selected the same UL GF resources and a collision on the UL occurs. Therefore, an intervention by UE2 120 is required. For example, the UE2 120 sends a "conflict resolution message" to the UE1 100 and the UE3 310, and UE2 120 further indicates where the UE1100 and UE3 310 should send the UL GF messages. This resolves the collision on the UL.

Table IV represents the format for the conflict resolution Message which may be sent via the sidelink feedback channel.

TABLE IV the conflict resolution message format being send via the sidelink feedback channel.

| Collision indicator | 1 bit | Provides information that one or more UEs accessing the same UL GF resources |
|---|---|---|
| Indication 1, Indication 2, etc., | Each indicator is 14 bits | Indication granularity for Grant Free time-frequency resources by higher layer parameter TF-unit |

Figure 9:
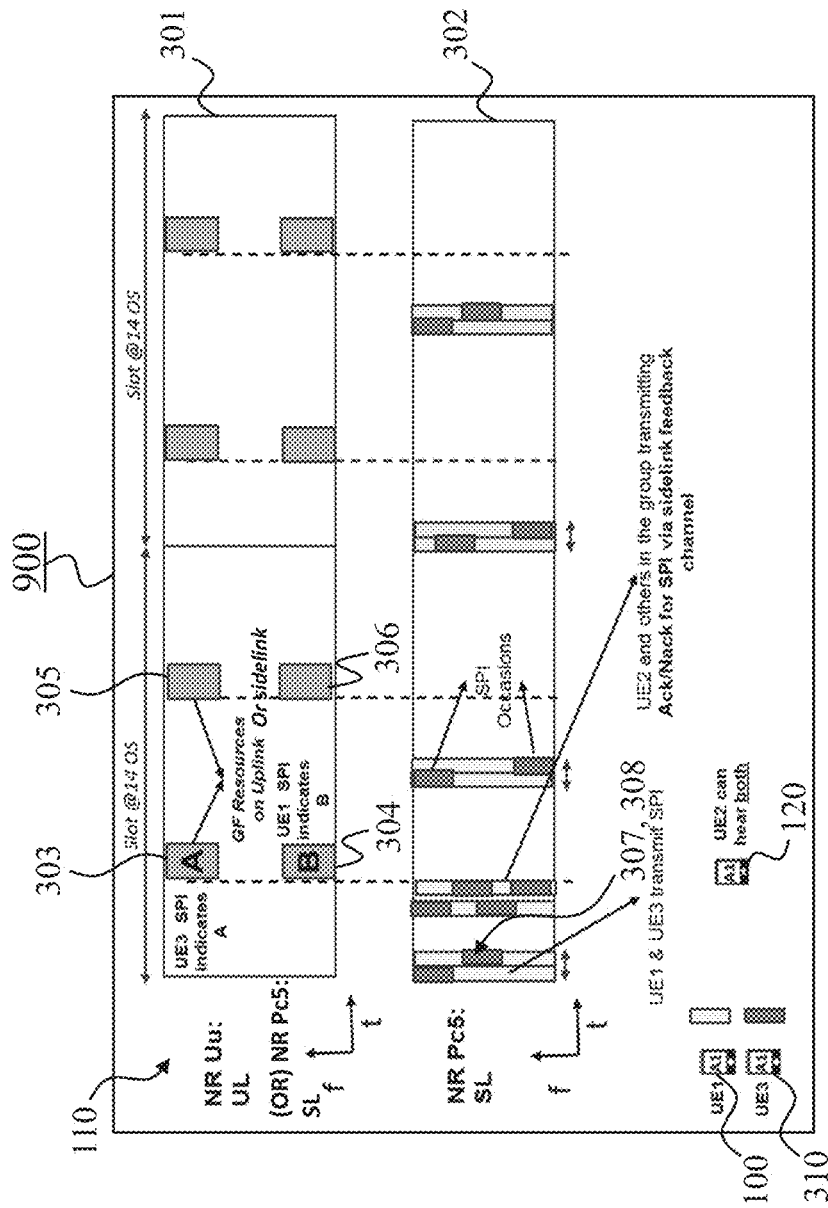
FIG. 9 illustrates a schematic view of an exemplary system for improving the reliability of the SPI reception, according to various embodiments of the present disclosure.

FIG. 9 illustrates a schematic view of an exemplary system 900 for improving the reliability of the SPI reception, according to various embodiments of the present disclosure.

The system 900 exemplary is configured to improve the reliability of the SPI control message. The network device 110 may be the BS 110 in the cases of NR-Uu or the UE 110 in the case of the NR Pc5. Moreover, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In this case, the UE1 100 and the UE3 310 have their SPI transmissions 307, and 308 respectively, in a group. Moreover, the UE2 120 and other UEs in the group can hear both of the UE1 100 and the UE3 310, and may further provide a fast group feedback to the UE1 100 and the UE3 310 which may enhance the SPI reliability.

For example, in this case, the UE1 100 and the UE3 310 may select different UL GF resources, and have no collision on the UL. Therefore, no intervention by the UE2 120 is required, and the SPI works fine.

Figure 10:
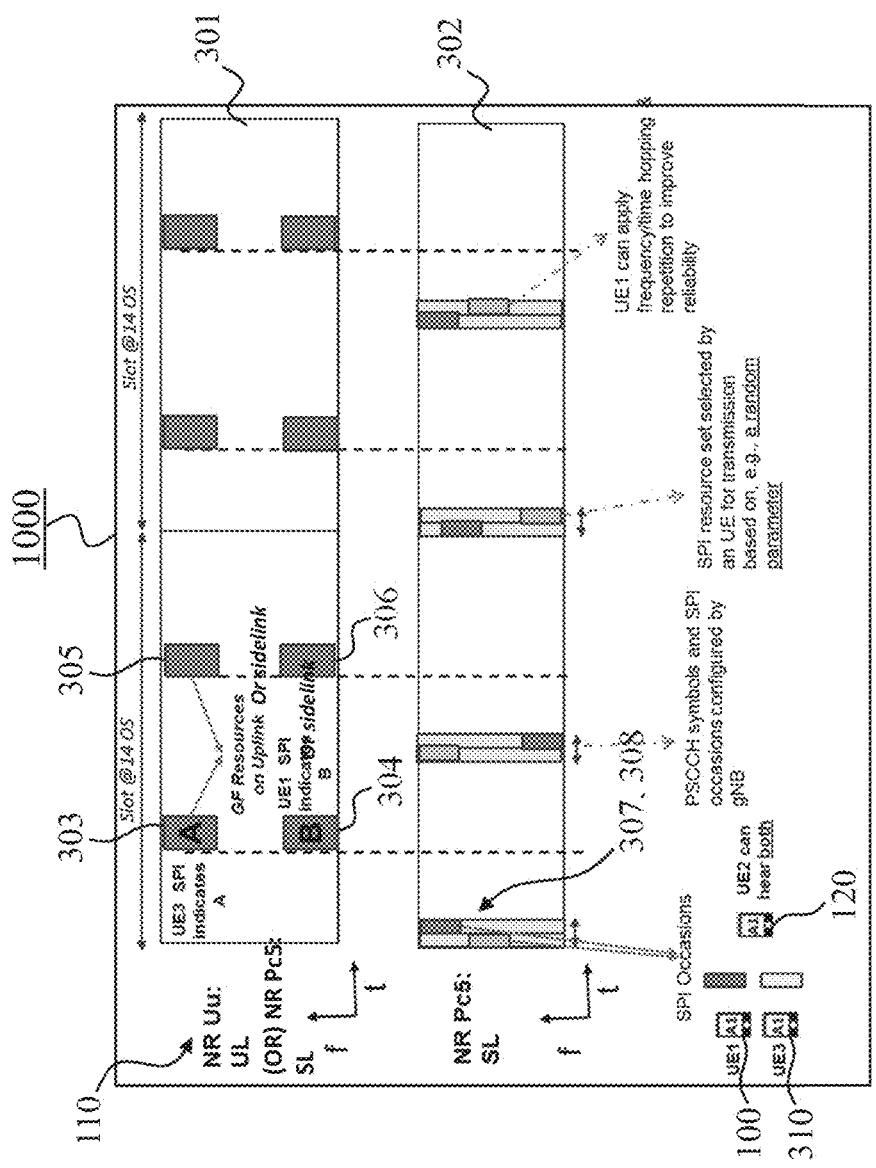
FIG. 10 illustrates a schematic view of an exemplary system for providing a contention based sidelink reservation scheme, according to various embodiments of the present disclosure.

FIG. 10 illustrates a schematic view of an exemplary system 1000 for providing a contention based sidelink reservation scheme, according to various embodiments of the present disclosure. Moreover, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In some embodiments, a low latency broadcast or groupcast control message may be sent via the sidelink control channel to enhance the reliability of the sidelink grant free transmission, e.g., by selection and reservation of the certain grant free resource for a period of time.

For example, in order to improve the SL GF reliability by reducing the collisions on the GF resource with the SPI, e.g., when a UE 100 wants to send an urgent sidelink URLLC data transmission in a preconfigured resource (e.g., the RRC configured grant type 1, where the grant free resource are preconfigured), the UE 100 sends a low latency sidelink pre indicator message (SPI) via the sidelink control channel (PSCCH) via the broadcast signaling or the groupcast signaling to the nearby UEs 120, 310. The SPI message may be related to the selection and reservation of the certain grant free resource for a period of time. Moreover, the particular sidelink grant free resource, and the sidelink UEs are configured to listen to the SPI message, e.g., by the gNB 110. The network device 110 may be the BS 110 in the cases of NR-Uu or the UE 110 in the case of the NR Pc5.

Figure 11:
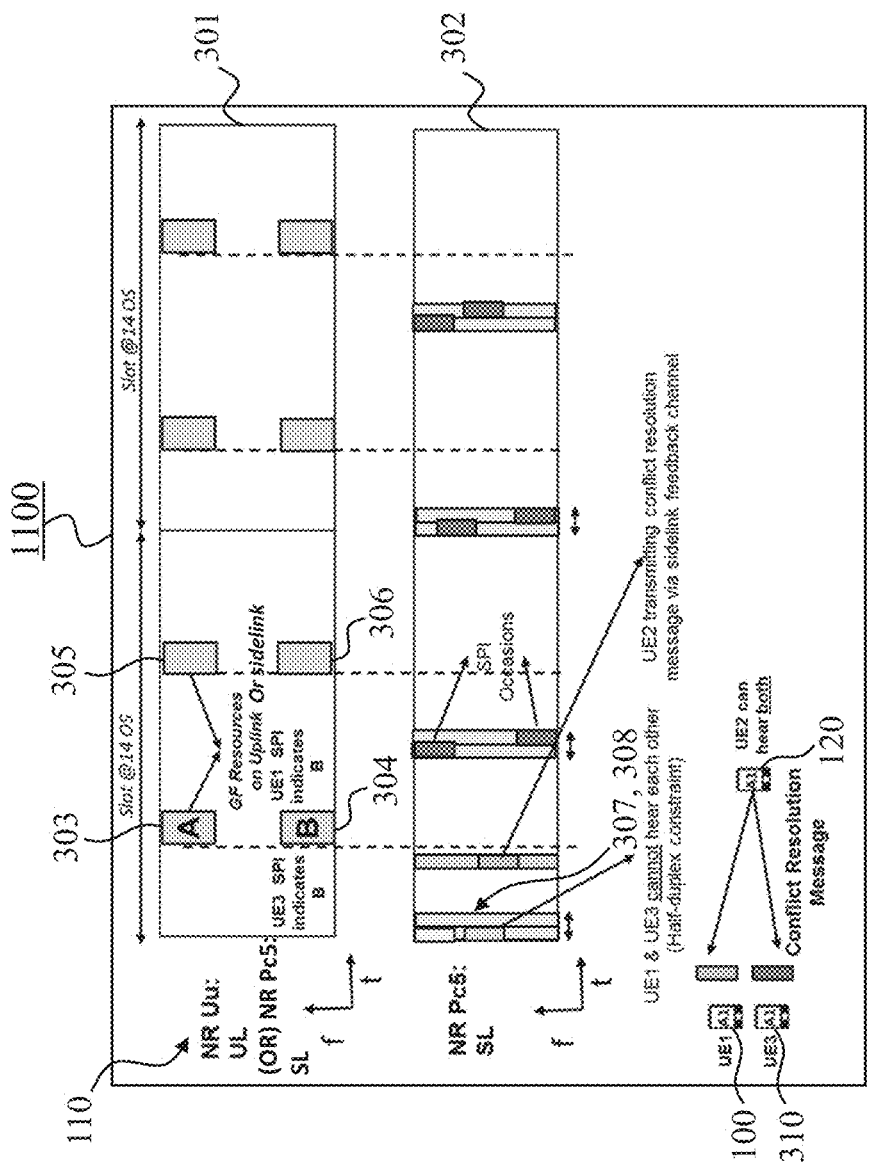
FIG. 11 illustrates a schematic view of an exemplary system for improving the reliability of the SPI reception in sidelink resource reservation scheme, according to various embodiments of the present disclosure.

FIG. 11 illustrates a schematic view of an exemplary system 1100 for improving the reliability of the SPI reception in sidelink resource reservation scheme, according to various embodiments of the present disclosure.

The system 1100 exemplary is configured to provide a conflict resolution message for the SPI to improve the reliability of the SPI control message in the sidelink resource reservation scheme, e.g., to solve the half duplex constraint and the collision of the SPI. The network device 110 may be the BS 110 in the cases of NR-Uu or the UE 110 in the case of the NR Pc5. Moreover, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In some embodiments, in order to improve the reliability of the SPI reception in sidelink resource reservation scheme, a conflict resolution for the SPI may be provided.

I the following three different cases for the conflict resolution are discussed.

The first case is, for example, when the UE1 100 and the UE3 310 have their SPI transmissions (i.e., 307 and 308) in sidelink resource reservation scheme, at the same time. Moreover, they cannot hear each other and Half-duplex constraint occurs. Furthermore, UE2 120 can hear both, because UE2 120 only listens to the SPI occasions, in sidelink resource reservation scheme. Moreover, UE2 120 identifies where the UE1 100 and the UE3 310 want to transmit the SL GF. In this case, the UE1 100 and the UE3 310 have selected different SL GF resources. Therefore, no collision occurs on the SL, and consequently, no intervention by the UE2 120 is required and the SPI works fine, e.g., in its preconfigured condition.

In the second case, with respect to the FIG. 11, for example, when the UE1 100 and the UE3 310 have their SPI transmissions (i.e., 307 and 308), in sidelink resource reservation scheme at the same time. Moreover, they cannot hear each other and Half-duplex constraint occurs. Furthermore, UE2 120 can hear both, because UE2 120 only listens to the SPI occasions, in sidelink resource reservation scheme. UE2 120 identifies where the UE1 100 and the UE3 310 want to transmit their SL GF. In this case, the UE1 100 and UE3 310 have selected the same SL GF resources and a collision on the SL occurs. Therefore, an intervention by UE2 120 is required. For example, the UE2 120 sends a "conflict resolution message" to the UE1 100 and the UE3 310, and UE2 120 further indicates where the UE1 100 and UE3 310 should send the SL GF messages. This resolves the collision on the SL. For example, the format for the conflict resolution Message which may be sent via the sidelink feedback channel may be based on and/or similar to the format for the UL which is shown in table IV.

Figure 12:
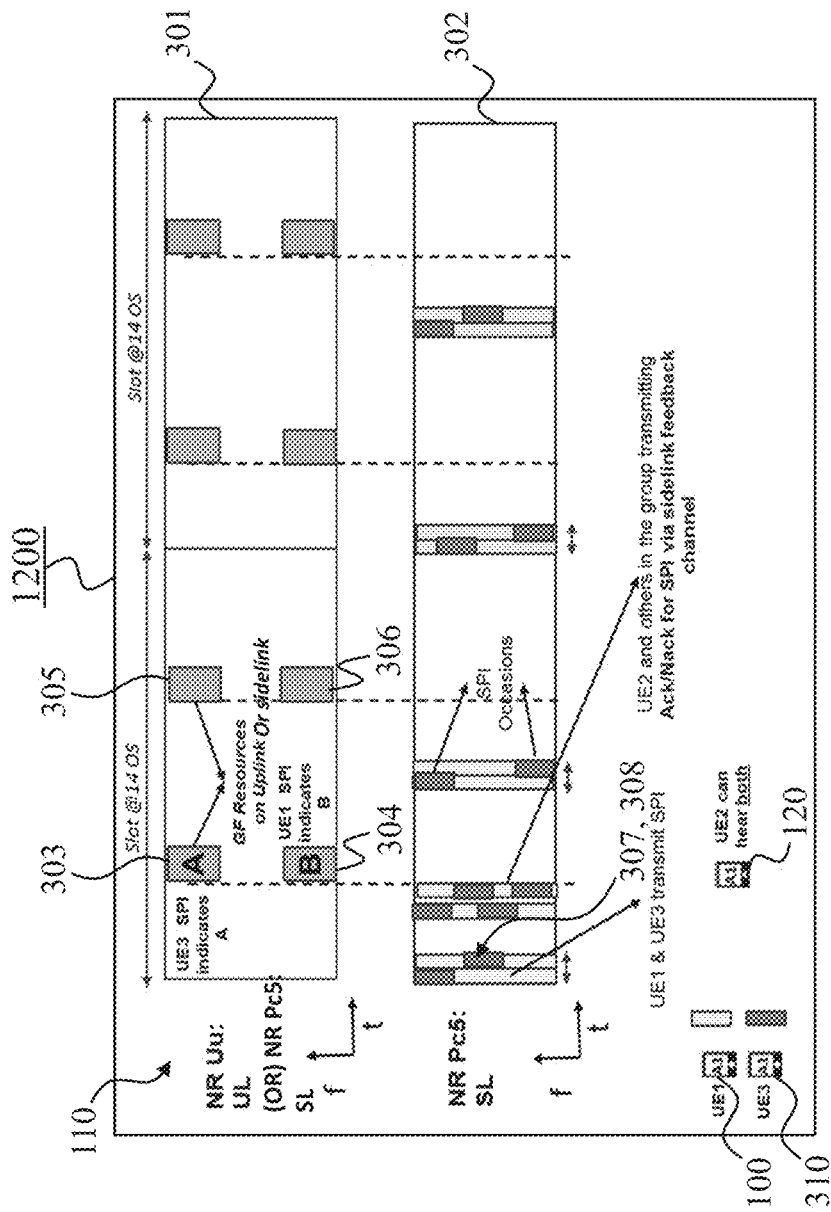
FIG. 12 illustrates a schematic view of an exemplary system for improving the reliability of the SPI reception in sidelink resource reservation scheme, according to various embodiments of the present disclosure.

FIG. 12 illustrates a schematic view of an exemplary system 1200 for improving the reliability of the SPI reception in sidelink resource reservation scheme, according to various embodiments of the present disclosure.

The system 1200 exemplary is configured to improve the reliability of the SPI control message in the sidelink resource reservation scheme. The network device 110 may be the BS 110 in the cases of NR-Uu or the UE 110 in the case of the NR Pc5. Moreover, when the 2D frame 301 represents the time and frequency domain for the NR Uu: UL, it includes the UL resources 303, 304, 305 and 306. Similarly, when the 2D frame 301 represents the cases of the time and frequency domain for the NR Pc5: SL, it includes the SL resources 303, 304, 305 and 306.

In this case, the UE1 100 and the UE3 310 have their SPI transmissions 307, and 308, respectively, in a group. Moreover, the UE2 120 and other UEs in the group can hear both of the UE1 100 and the UE3 310, and may further provide a fast group feedback to the UE1 100 and the UE3 310 which may enhance the SPI reliability.

For example, in this case, the UE1 100 and the UE3 310 may select different SL GF resources, and have no collision on the SL. Therefore, no intervention by the UE2 120 is required, and the SPI works fine.

Figure 13:
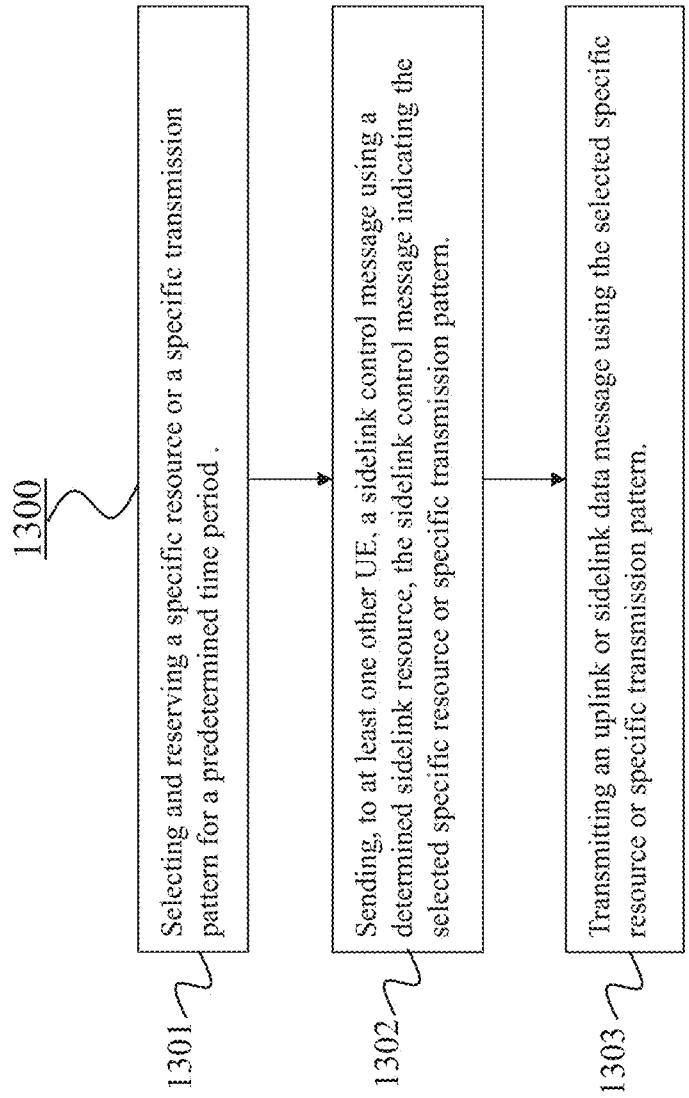
FIG. 13 schematically illustrates a method for a wireless communication device, according to various embodiments of the present disclosure.

FIG. 13 shows a method 1300 for a wireless communication device (e.g., a UE) 100, according to an embodiment of the disclosure. The method 1300 may be carried out by the wireless communication device (e.g., a UE) 100, as it described above.

The method 1300 comprises a step 1301 of selecting and reserving a specific resource 111 or a specific transmission pattern 112 for a predetermined time period t.

The method 1300 further comprises a step 1302 of sending, to at least one other UE 120, a sidelink control message 101 using a determined sidelink resource 102, the sidelink control message 101 indicating the selected specific resource 111 or selected specific transmission pattern 112.

The method 1300 further comprises a step 1303 of transmitting an uplink 103 or sidelink data message 104 using the selected specific resource 111 or specific transmission pattern 112.

Figure 14:
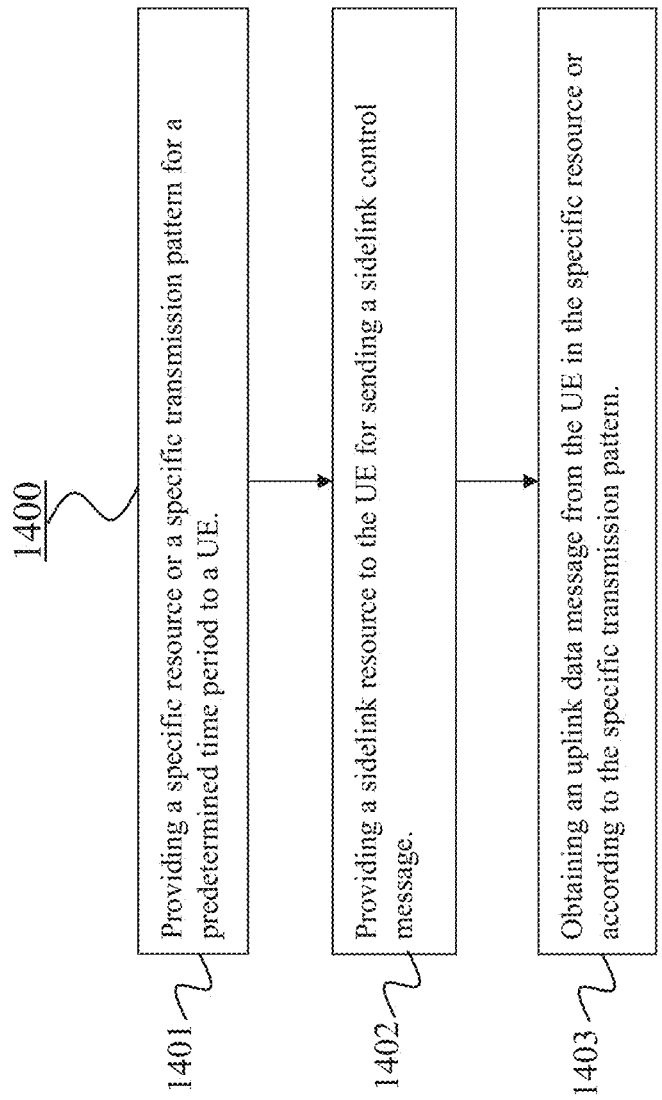
FIG. 14 schematically illustrates a method for a base station, according to various embodiments of the present disclosure.
Figure 15:
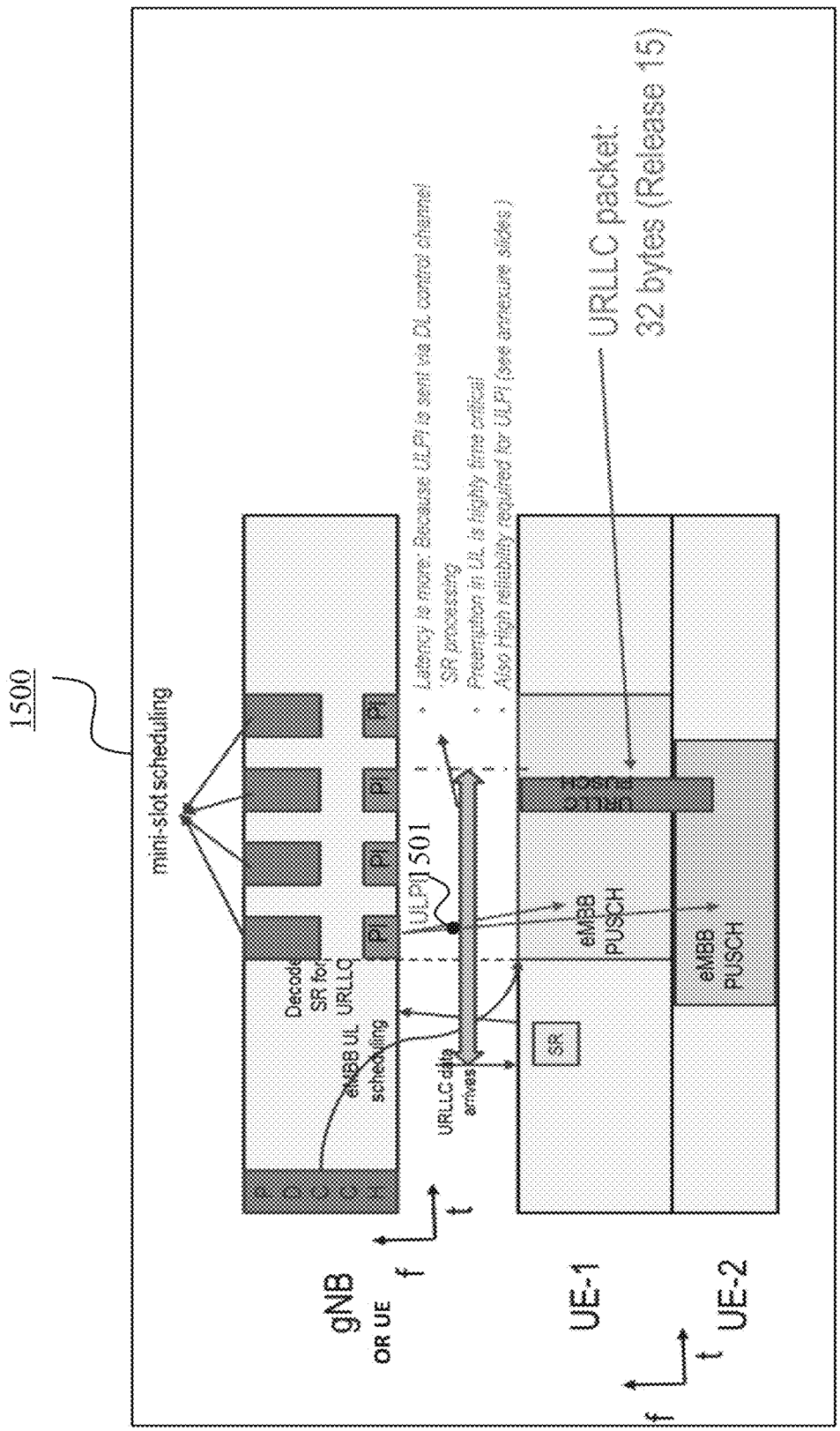
FIG. 15 schematically illustrates an UL resource reservation scheme, according to prior art.

FIG. 14 shows a method 1400 for a network device (e.g., a BS) 110 according to an embodiment of the disclosure. The method 1400 may be carried out by the network device 110, as it described above.

The method 1400 comprises a step 1401 of providing a specific resource 111 or a specific transmission pattern 112 for a predetermined time period t to a UE 100.

The method 1400 further comprises a step 1402 of providing a sidelink resource 102 to the UE 100 for sending a sidelink control message 101.

The method 1400 further comprises a step 1403 of obtaining an uplink data message 103 from the UE 100 in the specific resource 111 or according to the specific transmission pattern 112.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A wireless communication device, comprising a memory storing computer program, and at least one processor coupled to the memory, wherein the computer program, when executed by the at least one processor, causes the at least one processor to:

select and reserve at least one of a specific resource or a specific transmission pattern for a predetermined time period;

receive, from a network device, a sidelink resource, wherein the sidelink resource is a sidelink resource that is for the wireless communication device to send a sidelink control message;

send, to at least one User Equipment (UE), the sidelink control message using the sidelink resource received from the network device, the sidelink control message indicating at least one of the specific resource or the specific transmission pattern; and transmit, to the network device, an uplink data message using at least one of the specific resource or the specific transmission pattern.

2. The wireless communication device according to claim 1, wherein the specific resource or the specific transmission pattern is selected from a pre-configured resources set or a pre-configured transmission pattern set.

3. The wireless communication device according to claim 1, wherein the sidelink control message is sent to the at least one UE via a Physical Sidelink Control Channel (PSCCH) or via a broadcast signaling or a groupcast signaling indicating Listen and Decode Control Channel Before Transmission (LDCCHBT).

4. The wireless communication device according to claim 1, wherein the computer program, when executed by the at least one processor, further causes the at least one processor to:

select an occasion for the sidelink control message from a set of determined occasions provided by the network device, wherein the set of determined occasions is pre-configured.

5. The wireless communication device according to claim 1, wherein the computer program, when executed by the at least one processor, further causes the at least one processor to:

listen to the at least one UE to receive a second sidelink control message indicating a second specific resource or a second specific transmission pattern selected and reserved by the least one other UE for the predetermined time period.

6. The wireless communication device according claim 5, wherein the computer program, when executed by the at least one processor, further causes the at least one processor to:

receive a conflict resolution message, from the at least one UE, indicating information that the wireless communication device and the at least one UE selected or reserved a same specific resource or a same specific transmission pattern for the predetermined time period.

7. The wireless communication device according to claim 5, wherein the computer program, when executed by the at least one processor, further causes the at least one processor to:

listen to at least one UE served by a same Base Station (BS) as the wireless communication device and listen to at least one UE served by a neighboring BS to receive sidelink control messages.

8. The wireless communication device according to claim 1, wherein the computer program, when executed by the at least one processor, further causes the at least one processor to:

determine that at least one UE selected or reserved a same specific resource or specific transmission pattern for a same time period; and send, to the at least one UE, the sidelink control message including an instruction.

9. The wireless communication device according to claim 8, wherein the instruction includes one or more of:

a notification command requesting the at least one UE to cancel uplink or sidelink data message scheduled in at least one of the specific resource or an overlapped resource of a transmission of the at least one UE;

a notification command requesting the at least one UE to reduce power of the uplink or sidelink data message transmitted in the specific resource;

a detailed configuration of UE specific Channel State Information-Reference Signals (CSI-RS) of at least one of a serving beam or a candidate beam of a beam based transmission scheme; or a relative timing advance.

10. The wireless communication device according to claim 1, wherein the sidelink control message indicates an Uplink (UL) Grant Free (GF) transmission in one or more UL Bandwidth Parts (BWPs).

11. The wireless communication device according to claim 10, wherein the UL GF transmission is included in a Grant Based (GB) resource of an enhanced Mobile Broadband (eMBB).

12. A method for a wireless communication device, the method comprising:

selecting and reserving a specific resource or a specific transmission pattern for a predetermined time period;

receiving, from a network device, a sidelink resource, wherein the sidelink resource is a sidelink resource that is for the wireless communication device to send a sidelink control message;

sending, to at least one User Equipment (UE), the sidelink control message using the sidelink resource received from the network device, the sidelink control message indicating the specific resource or the specific transmission pattern; and transmitting, to the network device, an uplink data message using the specific resource or the specific transmission pattern.

13. The method according to claim 12, further comprises:

selecting an occasion for the sidelink control message from a set of determined occasions provided by the network device, wherein the set of determined occasions is pre-configured.

14. The method according claim 12, further comprises:

receiving a conflict resolution message, from the at least one UE, indicating information that the wireless communication device and the at least one UE selected or reserved a same specific resource or a same specific transmission pattern for the predetermined time period.

15. The method according claim 12, further comprises:

determining that at least one UE selected or reserved a same specific resource or specific transmission pattern for a same time period; and sending, to the at least one UE, the sidelink control message including an instruction.

16. The method according claim 15, wherein the instruction includes one or more of:

a notification command requesting the at least one UE to cancel uplink or sidelink data message scheduled in at least one of the specific resource or an overlapped resource of a transmission of the at least one UE;

a notification command requesting the at least one UE to reduce power of the uplink or sidelink data message transmitted in the specific resource;

a detailed configuration of UE specific Channel State Information-Reference Signals (CSI-RS) of at least one of a serving beam or a candidate beam of a beam based transmission scheme; or a relative timing advance.

17. A network device, comprising a memory storing computer program, and at least one processor coupled to the memory, wherein the computer program, when executed by the at least one processor, causes the at least one processor to:

provide a specific resource or a specific transmission pattern for a predetermined time period to a User Equipment (UE);

provide a sidelink resource to the UE for sending a sidelink control message; and obtain an uplink data message from the UE in the specific resource or according to the specific transmission pattern.

18. The network device according to claim 17, wherein the specific resource or the specific transmission pattern is selected from a pre-configured resources set or a pre-configured transmission pattern set.

19. The network device according to claim 17, wherein the computer program, when executed by the at least one processor, further causes the at least one processor to:

coordinate, with at least one Base Station (BS), the sidelink resource to be the same for each BS.

20. The network device according to claim 17, wherein the computer program, when executed by the at least one processor, further causes the at least one processor to:

coordinate, with at least one Base Station (BS), a set of specific resources or specific transmission patterns to be different for each BS.

* * * * *

UNITED STATES PATENT AND TRADEMARK OFFICE
CERTIFICATE OF CORRECTION

| | | |
|---|---|---|
| PATENT NO. | : 12,004,121 B2 | Page 1 of 1 |
| APPLICATION NO. | : 17/242941 | |
| DATED | : June 4, 2024 | |
| INVENTOR(S) | : Karthikeyan Ganesan et al. | |

It is certified that error appears in the above-identified patent and that said Letters Patent is hereby corrected as shown below:

On the Title Page

In Column 2 item (56) (Other Publications), In Line 2, Delete "Sidelink3GPP" and insert -- Sidelink 3GPP --.

In the Claims

In Column 19, In Line 31, In Claim 5, before "least" insert -- at --.

In Column 19, In Line 33, In Claim 6, after "according" insert -- to --.

In Column 20, In Line 37 (Approx.), In Claim 14, after "according" insert -- to --.

In Column 20, In Line 43, In Claim 15, after "according" insert -- to --.

In Column 20, In Line 49, In Claim 16, after "according" insert -- to --.

Signed and Sealed this
Twenty-ninth Day of October, 2024

Katherine Kelly Vidal
*Director of the United States Patent and Trademark Office*